2,948,655

NON-DUSTY WATER-DISPERSIBLE FUNGICIDAL COMPOSITION

Albert L. Flenner, Wilmington, Del., assignor to E. I. du Pont de Nemours and Company, Wilmington, Del., a corporation of Delaware No Drawing. Filed Apr. 3, 1958, Ser. No. 726,028

2 Claims. (Cl. 167—42)

This invention relates to non-dusty, water-dispersible fungicidal wettable powder compositions containing tetramethyl thiuram disulfide as the active fungicide.

Tetramethyl thiuram disulfide is a well-known agricultural fungicide that has found widespread usage in formulations for use in treating foliage, seeds and turf. Unfortunately this compound is irritating to the nose, throat and skin and can cause dermatitis in some individuals.

To use this valuable fungicide as an aqueous spray, it is necessary to have the tetramethyl thiuram disulfide as a wettable powder in a very finely-divided, concentrated state. Because the compound is relatively insoluble in water, the wettable powder must be dispersed in a spray slurry in order to obtain a usefully high concentration of active fungicidal ingredient for spray purposes. If the tetramethyl thiuram disulfide is not in a very finely divided form in the dispersion, it will not pass through spray nozzles and reach foliage. But when tetramethyl thiuram disulfide is in such a suitably finely-divided, concentrated state, it is very dusty. Such dust appears to make the skin-irritating effects be at their very worst.

In order to safely prepare aqueous sprayable dispersions of tetramethyl thiuram disulfide, some means must be found to substantially reduce the great dustiness associated with the compound in a finely-divided, concentrated state without affecting the capacity of the finely-divided compound to disperse in water.

I have now discovered a non-dusty wettable powder formulation of tetramethyl thiuram disulfide that can be extended with water to give a sprayable composition that is ideal for use as a foliar fungicidal spray. My wettable powder is characterized by being extremely low in dustiness thereby minimizing the skin irritating effects of the tetramethyl thiuram disulfide to operating personnel. Yet, at the same time, my wettable powder composition wets quickly and gives a finely-dispersed non-agglomerated aqueous suspension. The result is a superior product which can be handled commercially without encountering skin irritancy and, at the same time, provides a most satisfactory type of aqueous spray dispersion.

More particularly, the fungicidal compositions of my invention contain from about 63 to 68 parts by weight of tetramethyl thiuram disulfide, 2 to 4 parts by weight of bentonite, 25 to 30 parts by weight of kaolinite, 0.25 to 0.75 part by weight of sodium lignin sulfonate, 0.25 to 0.75 part by weight of sodium alkyl aryl sulfonate, 0.5 to 1.5 parts by weight of alkylated aryl polyether alcohol, and 1.0 to 3.0 parts by weight of a paraffinic summer spray oil. The components all have a particle size of less than about 20 microns in average diameter.

The sodium lignin sulfonate used in the compositions of this invention can be any desulfonated sodium lignin sulfonate prepared through the partial hydrolysis and partial desulfonation of lignosulfonates. Such materials are described, for example in U.S. Patent No. 2,371,136 or 2,491,832. Such partially desulfonated sodium lignin sulfonates are widely available under a variety of trade names as "Orzan," "Polyfon," "Marasperse," and the like.

Usually the amount of sodium lignin sulfonate used in the compositions of the invention will range broadly from about 0.25 to 0.75 part by weight, as indicated above. Preferably, however, the compositions of the invention contain about 0.5 part by weight of sodium lignin sulfonate. Sodium lignin sulfonate serves as a dispersing agent in the compositions of this invention.

The sodium alkyl aryl sulfonate used in the compositions of this invention serves as a wetting agent. Sodium alkyl aryl sulfonate is well known and is available commercially under a variety of trade names, including "Alkanol B," "Nacconol" NR, "Nekal" BA-75, "Santomerse-1."

As noted above, the amount of sodium alkyl aryl sulfonate used in the compositions of this invention will usually range from about 0.25 to 0.75 part by weight. About 0.45 part by weight is preferred, however.

The alkylated aryl polyether alcohol used in the compositions of this invention serves as an emulsifying agent. This material is well known and is available commercially under a variety of trademarks, including "Triton" X45, "Druterge" ON, "Hyonic" PE250, "Ninox" BFO. Usually the compositions of the invention will contain from about 1.0 to 3.0 parts by weight of such material although preferably the compositions of the invention contain 2.0 parts by weight of alkylated aryl polyether alcohol.

The paraffinic summer spray oil used is characterized by having a minimum unsulfonatable residue of at least 65% by weight, a viscosity at 100° F. of from about 55 to 80 Sabolt Universal seconds (S.U.S.), a color index of about 3, a pour point in degrees Fahrenheit of 25 maximum, and a flash point (open cup) in degrees Fahrenheit of 280 minimum. This material is well known and is available commercially under a variety of trademarks, including "Sovaspray" No. 3, "Orprex" No. 3.

The compositions of the invention can contain from about 1.0 to 3.0 parts by weight of such paraffinic summer spray oil, although preferably these compositions contain about 2.0 parts by weight of such oil.

The bentonite used in the compositions of the invention is that commonly available commercially and, as noted, the compositions of the invention will contain about 1 to 3 parts by weight of such substance. Preferably, however, the compositions of the invention will contain about 3 parts by weight of bentonite. This material is well known and is available commercially under a variety of trademarks, including "Wyogel," "Volclay" SPV, "Fesco-Jel."

Similarly, the kaolinite used is that material which is commonly available commercially. As noted, about 25 to 30 parts by weight of kaolinite are used in the compositions of this invention although preferably the compositions contain about 26 parts by weight of kaolinite.

The compositions of the invention will be in the form of free-flowing wettable powders composed of particles having average diameters of not greater than about 20 microns. Preferably, however, the compositions of the invention will contain particles whose average diameters are not greater than 12 microns.

The compositions of my invention are preferably prepared by placing the tetramethyl thiuram disulfide, bentonite, kaolinite, sodium alkyl aryl sulfonate, and sodium lignin sulfonate in a blender and blending until the components are well mixed. In some instances it will be desirable to micropulverize the blended compositions down to average diameter particle sizes of less than about 12 microns.

Next, a mixture of the oily constituents, that is, the alkyl aryl polyether alcohol emulsifier and the paraffinic summer spray oil, is then sprayed onto the surface of the dry ingredients while they are being tumbled in the blender. After all of the oily mixture has been added, the resulting material is passed through a deagglomerating mill to break down any agglomerates and complete the blending.

The product is a powder having a heavy, slightly "wet" appearance. When handled, such as removing it from a bag, weighing it, pouring it into a spray tank, etc., it does not form a cloud of fine dust that would remain suspended in air for any extended period of time and give rise to irritation of skin and mucous membranes. Yet even though the powder is "wet" appearing it can be easily dispersed in water to give a finely divided suspension.

The resulting powder compositions are readily dispersed in water to form dilute, sprayable formulations which ordinarily will contain from about 0.2 to 2.5 weight percent of the wettable powder. Such sprays are applied to plant foliage such as apple trees and give excellent control of fungus infestations of the foliage treated. When applied in this manner, this wettable powder is of extremely low phytoxicity to the plant. For these reasons, it is ideally suited for use as an agricultural foliar spray fungicide.

To illustrate my invention more clearly, the following examples are given in addition to those set forth above.

*Example 1*

A wettable powder composition was prepared by thoroughly blending in a ribbon-type blender the following ingredients: 67.0 parts by weight of tetramethyl thiuram disulfide (97% purity), 3.0 parts by weight of bentonite, 26.0 parts by weight of Homer clay kaolinite, 0.5 part by weight of "Marasperse" CB sodium lignin sulfonate dispersing agent, and 0.5 part by weight of "Alkanol" B sodium alkyl aryl sulfonate wetting agent. These materials all have a particle size below 12 microns.

To the mixture of ingredients in the blender was then added 3.0 parts by weight of an oily mixture containing 2.0 parts by weight of "Sovaspray" Oil No. 3 paraffinic spray oil and 1.0 part by weight of "Triton" X45 alkylated aryl polyether alcohol emulsifier.

"Sovaspray" Oil No. 3 has, as its manufacturers' specifications, a viscosity of 100° F. of 55–65 Saybolt Universal seconds (S.U.S.), a color index of 3, an unsulfonatable residue of 70% minimum, a pour point ° F. of 25 maximum, and a flash point (open cut) ° F. of 280 minimum.

After all of the oily mixture was added, the composition was passed through a deagglomerating mill to disperse any agglomerates and complete the blending.

The resulting powder composition was then extended with water to form a well-dispersed sprayable formulation containing 0.25% by weight of the wettable powder. This aqueous formulation was then sprayed upon apple trees growing in an orchard using conventional spraying apparatus. It was found that this treatment gave excellent control of apple scab *Venturia inaequalis*. No skin irritation resulted to the spray operator.

*Examples 2 and 3*

Using the procedure described in Example 1, the following two formulations are prepared. The product of Example 2 has an average particle size of less than about 20 microns while that prepared according to Example 3 is less than 12 microns.

| | Example 2 | Example 3 |
|---|---|---|
| Tetramethyl thiuram disulfide. | 68.00 | 63.00. |
| Bentonite | 2.00 "Volclay" SPV | 4.00 "Fesco-Jel." |
| Kaolinite | 25.00 | 30.00. |
| Sodium lignin sulfonate | .25 "Polyfon" T | .75 "Orzan" S. |
| Sodium alkyl aryl Sulfonate. | .25 "Nacconol" NR | .75 "Santomerse" I. |
| Alkylated aryl polyether alcohol. | 1.50 "Hyonic" PE250. | 0.50 "Ninox" BFO. |
| Paraffinic summer spray oil. | 3.00 "Sovaspray" #3 | 1.00 "Orprex" #3. |

This application is a continuation-in-part of my application Ser. No. 564,115, filed February 8, 1956, now abandoned.

I claim:

1. A non-dusty, water-dispersible fungicidal composition containing from about 63–68 parts by weight of tetramethyl thiuram disulfide, 1–3 parts by weight of bentonite, 25–30 parts by weight of kaolinite, 0.25–0.75 part by weight of sodium lignin sulfonate, 0.25–0.75 part by weight of sodium alkyl aryl sulfonate, 0.5–1.5 parts by weight of alkylated aryl polyether alcohol, and 1.0–3.0 parts by weight of paraffinic summer spray oil, the total parts by weight in any one composition being 100, such composition being composed of particles whose average diameters are not greater than about 20 microns.

2. A non-dusty, water-dispersible fungicidal composition containing about 65 parts by weight of tetramethyl thiuram disulfide, about 3 parts by weight of bentonite, about 26 parts by weight of kaolinite, about 0.5 part by weight of sodium lignin sulfonate, about 0.5 part by weight of sodium alkyl aryl sulfonate, about 1.0 part by weight of alkylated aryl polyether alcohol, and about 2.0 parts by weight of a paraffinic summer spray oil the paraffinic summer spray oil used is characterized by having a minimum unsulfonatable residue of at least 65% by weight, a viscosity of 100° F. of from about 55 to 80 Saybolt Universal seconds (S.U.S.), a color index of about 3, a pour point in degrees Fahrenheit of 25 maximum, and a flash point (open cup) in degrees Fahrenheit of 280 minimum, such composition being composed of particles whose average diameters are less than about 12 microns.

References Cited in the file of this patent

UNITED STATES PATENTS

| | | |
|---|---|---|
| 1,800,114 | Sullivan et al. | Apr. 7, 1931 |
| 2,290,235 | Guy | July 21, 1942 |
| 2,346,362 | Dolman | Apr. 11, 1944 |
| 2,430,342 | Kagy et al. | Nov. 4, 1947 |
| 2,752,282 | Somerville | June 26, 1956 |

FOREIGN PATENTS

| | | |
|---|---|---|
| 106,160 | Australia | Dec. 13, 1938 |

OTHER REFERENCES

Woodruff: Jour. Econ. Ent., vol. 42, April 1949, pp. 243–253.

Frear: Chem. of Insect., Fung. and Herb., 1948, D. Van Nostrand, p. 67.

De Ong: Chem. and Uses of Pesticides, Reinhold Pub. Co., 1956, pp. 8, 308.

Bissinger: Agr. Chem., August 1952, pp. 31–33, 117–119.

Green: Ind. Eng., vol. 42, No. 2, February 1950, pp. 324–330.

Manuf. Chemist, September 1951, p. 359.